(12) United States Patent
Orchard

(10) Patent No.: US 7,464,579 B2
(45) Date of Patent: Dec. 16, 2008

(54) CALIBRATION BLOCK

(75) Inventor: Nicholas Barrington Orchard, Bristol (GB)

(73) Assignee: Rolls-Royce plc, London (GB)

( * ) Notice: Subject to any disclaimer, the term of this patent is extended or adjusted under 35 U.S.C. 154(b) by 90 days.

(21) Appl. No.: 11/790,412

(22) Filed: Apr. 25, 2007

(65) Prior Publication Data

US 2007/0271995 A1 Nov. 29, 2007

(30) Foreign Application Priority Data

May 24, 2006 (GB) .................... 0610367.5
Mar. 27, 2007 (GB) .................... 0705982.7

(51) Int. Cl.
*G01B 21/08* (2006.01)
*G01N 29/00* (2006.01)
(52) U.S. Cl. .............................. 73/1.81; 73/1.86
(58) Field of Classification Search ........... 73/1.81, 73/620, 617, 1.86
See application file for complete search history.

(56) References Cited

U.S. PATENT DOCUMENTS

| 3,908,439 A | * | 9/1975 | Pelak et al. | ............. 73/1.86 |
| 4,068,524 A | * | 1/1978 | Lewis et al. | ............. 73/614 |
| 6,415,644 B1 | | 7/2002 | Rockwood et al. | ......... 73/1.86 |
| 2005/0092091 A1 | | 5/2005 | Greelish | ............. 73/617 |

FOREIGN PATENT DOCUMENTS

WO    WO 2005/028996    3/2005

* cited by examiner

*Primary Examiner*—Hezron Williams
*Assistant Examiner*—Tamiko D Bellamy
(74) *Attorney, Agent, or Firm*—Oliff & Berridge, PLC

(57) ABSTRACT

A calibration block for use in calibrating a thickness gauge having a diameter d, wherein the block has a measurement face and a recess extending inwardly of the block from a face opposite the measurement face, the recess having a maximum transverse dimension at the opposite face which is not less than 3d, and in that the bottom of the recess is inclined relative to the measurement face in all directions from a central region of the bottom of the recess, the measurement face comprising a reference feature, the location of which corresponds to a specific point on the bottom of the recess.

16 Claims, 5 Drawing Sheets

CALIBRATION BLOCK

The present invention relates to calibration blocks and particularly but not exclusively relates to calibration blocks for thickness probes.

BACKGROUND

Thickness probes, such as ultrasonic thickness probes, are commonly used to investigate the properties of machined components. A known method of calibrating such probes for thickness measurement is to use a block of material 100 with one or more blind holes 102 drilled into it, as shown in FIG. 1 (PRIOR ART). The hole diameter and hole depth may vary between the holes in order to provide a range of calibration features. The probe to be calibrated 104 is used to measure the holes from the opposite side of the block. The measured values of material thickness t between the bottom of each hole 102 and the block face 106 are then compared to established thickness values, obtained using a different method, in order to calibrate the thickness probe 104.

When using a thickness probe to investigate a component, the probe is supported by a mechanical holding arm, allowing measurements to be taken at various points on the surface of the component. The position of the holding arm can be controlled using appropriate software, and the arm may be indexed to various positions within a three dimensional coordinate space, including a nominal origin of that space. The same mechanical arm is typically used to support several different probes during examination of a single component. For example, a touch probe is often used in conjunction with an ultrasonic thickness probe in order to map a component. Physical differences between different types of probe mean that a thickness probe mounted in a holding arm will not contact a component at exactly the same point as, for example, a touch probe mounted with the arm in the same position. It is not therefore possible to record the true coordinate position of the thickness probe with respect to the holding arm, or to the reference coordinate space within which it operates, without conducting further investigation to establish this position. Thickness probes are therefore rarely used in applications where this information is required.

When it is required to know the true coordinate position of a thickness probe, one method of calibrating the position of the probe, establishing the offset between the holding arm (whose exact coordinate position is known) and the thickness probe, would be to search over an area of the block to find the minimum measured thickness of the block. This minimum thickness would correspond to the location of the deepest hole. However, several disadvantages are associated with this method of calibrating the spatial position of a probe. The accuracy of this method depends upon the relative sizes of the probe and the calibration holes. A large diameter hole will provide a clear thickness reading but an inaccurate indication of position, as the minimum thickness reading will be obtained at multiple positions within the hole. In contrast, a smaller diameter hole, although reducing the area over which a minimum reading will be obtained, provides only a poor signal and can be difficult to locate. The accuracy of calibration is not therefore improved by using a small diameter hole. In addition to the problems associated with accuracy, the method outlined above is time consuming, as the only way to locate the desired hole is by trial and error, taking a large number of readings in different positions until the position of the hole is determined.

SUMMARY OF INVENTION

According to the present invention, there is provided a method of calibrating a thickness probe/gauge comprising:
a) using a calibration block having a measurement face and a recess extending inwardly of the block from a face opposite the measurement face, wherein at least part of the surface of the recess is inclined relative to the measurement face in all directions from a central region on the surface of the recess, and wherein the measurement face comprises a reference feature, the location of which corresponds to a known point on the inclined surface of the recess,
b) defining a co-ordinate system in the plane of the measurement face of the calibration block and extending perpendicularly into the calibration block, the coordinate system having an origin at the reference feature,
c) noting the actual position of inclined surface of the recess in the coordinate system, placing the thickness probe over the reference feature, at an undetermined offset from the origin of the coordinate system, and setting the nominal position of the thickness probe to zero,
d) placing the thickness probe over the reference feature at an undetermined offset from the origin o the coordinate system and setting the nominal position of the thickness probe to zero,
e) measuring the thickness of the calibration block at a plurality of recorded positions remote from the reference feature,
f) plotting the measured thickness values in the coordinate system,
g) constructing a measured inclined surface of the recess within the coordinate system from the plotted thickness value, and
h) comparing the measured position of the inclined surface of the recess to the actual position of the surface of the recess and generating a value representing the offset of the thickness probe relative to the defined coordinate system.

Step (e) of the method may comprise measuring the thickness of the calibration block at least six positions. Each of the positions may be at a different radial separation from and/or angular position about the reference feature.

The thickness probe may comprise any form of sensor capable of determining thickness from one side only of the measured component, such as an ultrasonic probe, an eddy current probe or a capacitance probe.

Step (b) of the method may comprise mounting a touch probe in a holding arm, using the touch probe to determine and record the location of the reference feature, setting the position of the holding arm when the touch probe is over the reference feature to be a reference position, and setting the location of the reference feature to be the origin of the coordinate system.

Step (d) may comprise mounting the thickness probe in the holding arm with the holding arm in the reference position.

The method of the present invention enables accurate calibration of the location of a thickness probe. The present method uses a series of measured thickness values to construct a known, geometrically inclined surface. The location of the constructed surface is then compared to the known location of an actual surface. The use of inclined surfaces enables an accurate comparison to be made between the measured thickness values and the actual thickness of the block: the surfaces will only be coincident at a single offset value, thus enabling the offset value to be accurately determined. This is in contrast to the prior art method, in which a user searches for a minimum thickness value, which value may be found at any number of points within a minimum thickness region (the bottom of a bore).

According to another aspect of the present invention, there is provided a calibration block for use in a method of calibrating a thickness probe/gauge, the block having a measurement face and a recess extending inwardly of the block from a face opposite the measurement face, wherein at least part of the surface of the recess is inclined relative to the measurement face in all directions from a central region of the bottom of the recess and wherein the measurement face comprises a reference feature, the location of which corresponds to a known point on the inclined surface of the recess.

Preferably the thickness gauge has a diameter d and the recess has a maximum transverse dimension at the opposite face which is not less than 3d. It is an advantage of the invention that the calibration block may be used with any probe having a diameter less than one third of the recess transverse dimension. The recess may therefore be sized such that the calibration block may be used with a wide range of differently sized probes.

The recess may have a circular cross section and the inclined surface of the recess may define a right circular cone. The location of the reference feature may correspond to the location of the apex of the cone.

The inclined surface of the recess may form an angle $\alpha$ with the plane of the measurement face of not less than about 3 degrees and not greater than about 45 degrees.

Preferably the inclined surface of the recess forms an angle $\alpha$ with the plane of the measurement face of substantially 15 degrees.

Alternatively, the inclined surface of the recess may define a shape selected from the group comprising a segment of a sphere, a hemisphere, a catenoid, a paraboloid and a truncated spheroid.

The reference feature may comprise any feature on the calibration block which can be detected by a touch probe or equivalent device to establish a reference position on the calibration block. The reference feature may be a dimple in the measurement face, or a reference bore which may, for example, extend between the measurement face and the recess.

A further advantage of the invention is that an accurate calibration may be achieved using a small number of readings. There is no requirement for a trial and error search for a particular feature of the block, the method simply requires a sufficient number of readings be taken to enable construction of the inclined surface of the recess. The number of readings required is not affected by the relative sizes of the block and probe, nor is it affected by the size of the offset to be determined. According to the prior art method, a large offset may result in a lengthy examination in order to locate the required minimum thickness region. However, the present method is equally fast and effective in calibrating for a small or a large offset.

A further advantage of the present invention is that the calibration is performed entirely within the defined coordinate system of the calibration block. The speed and accuracy of the calibration are unaffected by the actual position of the calibration block in space.

BRIEF DESCRIPTION OF THE DRAWINGS

For a better understanding of the present invention, and to show more clearly how it may be carried into effect, reference will now be made, by way of example, to the accompanying drawings, in which.

DETAILED DESCRIPTION OF PREFERRED EMBODIMENTS

Figure 1:
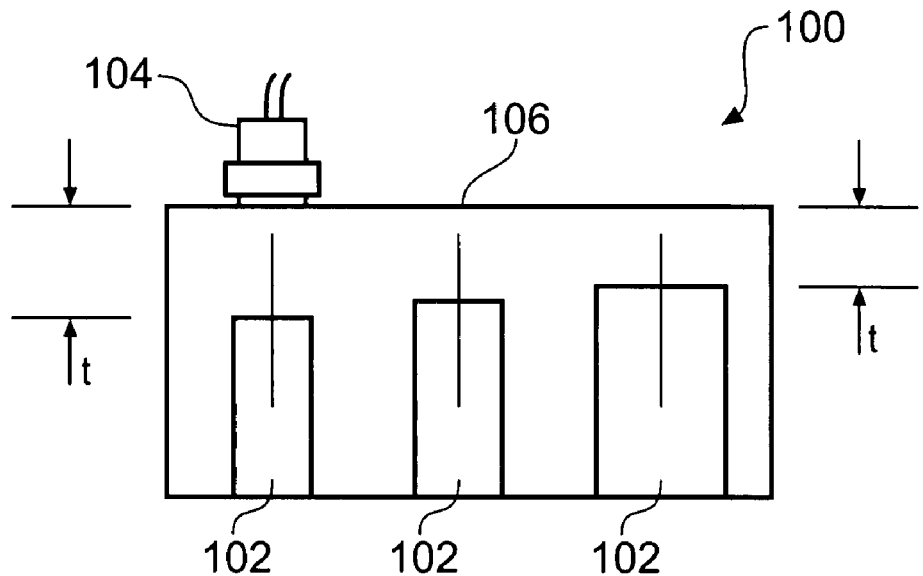
FIG. 1 (PRIOR ART) is a sectional view of a calibration block according to the prior art.
Figure 2:
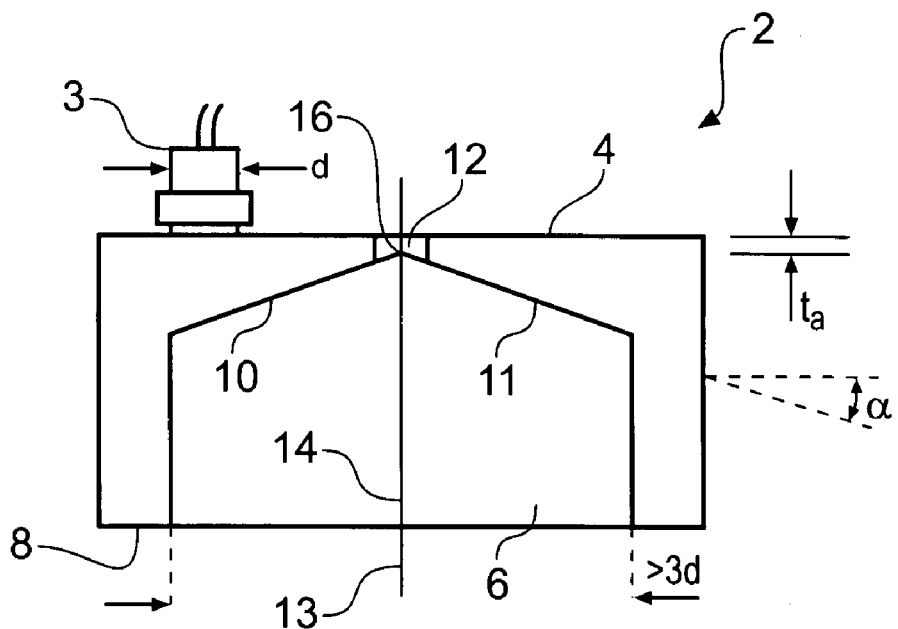
FIG. 2 is a sectional view of a calibration block according to the present invention.
Figure 3:
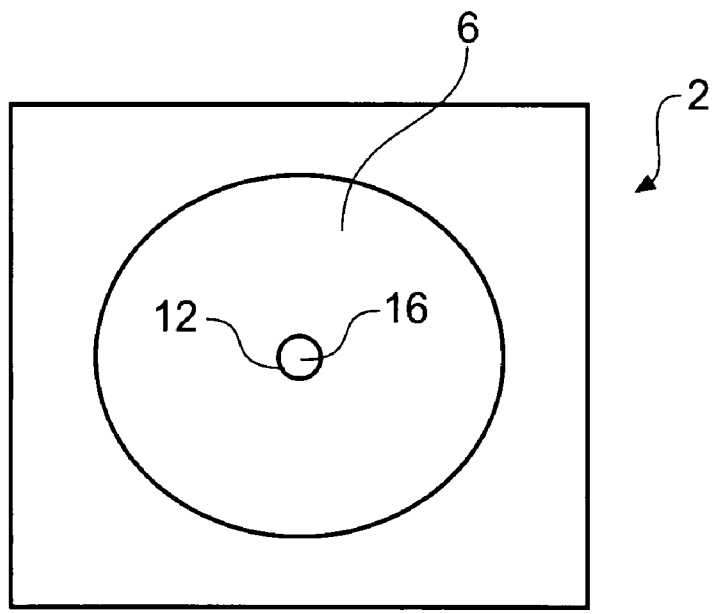
FIG. 3 is an end view of a calibration block according to the present invention.

With reference to FIG. 2, a calibration block 2, suitable for use in calibrating a thickness probe 3, comprises a flat measurement face 4 and a recess 6. The probe 3 may be any type of thickness probe (for example an ultrasonic probe, an eddy current probe or a capacitance probe) and has a nominal diameter d. The recess 6 extends into the block 2 from a face 8 that is opposite to the measurement face 4. A transverse dimension of the recess 6 at the face 8 is greater than the diameter d of the probe 3 by a factor of at least 3. The bottom 10 of the recess 6 is angled with respect to the measurement face 4, such that the bottom of the recess 6 which is an inclined surface 10 defines a right circular cone 11, having a cone axis 13. The inclined surface (or "bottom") 10 of the recess 6 forms an angle $\alpha$ with the plane of the measurement face 4. The angle $\alpha$ is sufficiently large to produce a defined cone but not so large as to compromise the reflected signal received by the thickness probe 3. The angle $\alpha$ is not less that about 3 degrees and no greater than about 45 degrees, although preferably the angle $\alpha$ is approximately 15 degrees. A reference bore 12 extends through the block 2 from the measurement face 4 into the recess 6. The reference bore 12 has a longitudinal axis 14. The axis 14 is coincident with the axis 13, such that the apex 16 of the cone 11 falls on the axis 14. The reference bore therefore indicates the two dimensional position of the apex 16.

The calibration block 2 may be used to calibrate a probe 3 such as an ultrasonic thickness probe. The block 2 may be used to establish (a) that the thickness probe 3 is measuring thickness accurately, and (b) the positional offset between the thickness probe 3 and a reference probe.

In use, the calibration block 2 is placed within a coordinate measuring machine (CMM) having a holding arm (not shown). A reference probe, which may be a touch probe, is mounted on the holding arm adjacent the measurement face 4 of the block 2, and is used to determine the position of the reference bore 12. The location of the opening of the reference bore 12 on the measurement face 4 is then set to be the origin of a three dimensional reference coordinate system. Within the coordinate system, the (x, y) plane is coincident with the plane of the measurement face 4, and the z axis extends perpendicularly from the (x, y) plane into the calibration block 2, coincident with the cone axis 13 of the cone 11. The position of the holding arm at which the contact point of the touch probe is at the origin of the coordinate system is recorded as the origin mounting position.

With the holding arm in the origin mounting position, the touch probe is replaced by the ultrasonic thickness probe and the nominal position of the contact point of the thickness probe is set to be at the origin of the coordinate system. The setting of the nominal contact point of the thickness probe to be at the origin of the coordinate system represents an initial assumption that there is zero offset between the touch probe and the thickness probe. However, physical differences between the touch probe and the thickness probe mean that the thickness probe will almost always be offset from the origin to an initially undetermined extent. The thickness probe is then used to measure the thickness of the calibration block at a series of recorded positions 20 around the nominal cone axis position. The number of measurements taken may be selected according to the shape of the inclined surface 10 of the recess 6 in the block 2 but will normally not be less than six and may be eight or ten. Each measurement point is preferably at a different radial and angular position with respect to the nominal cone axis position. For each measurement, both the thickness of the block 2 and the nominal coordinate position of the thickness probe 3 are recorded. The thickness readings are then converted into z axis coordinates, allowing the thickness readings to be plotted in the coordinate system. The measured surface 10 of the recess 6 may then be constructed by fitting a cone of the correct cone angle to the measured data points.

Figure 4:
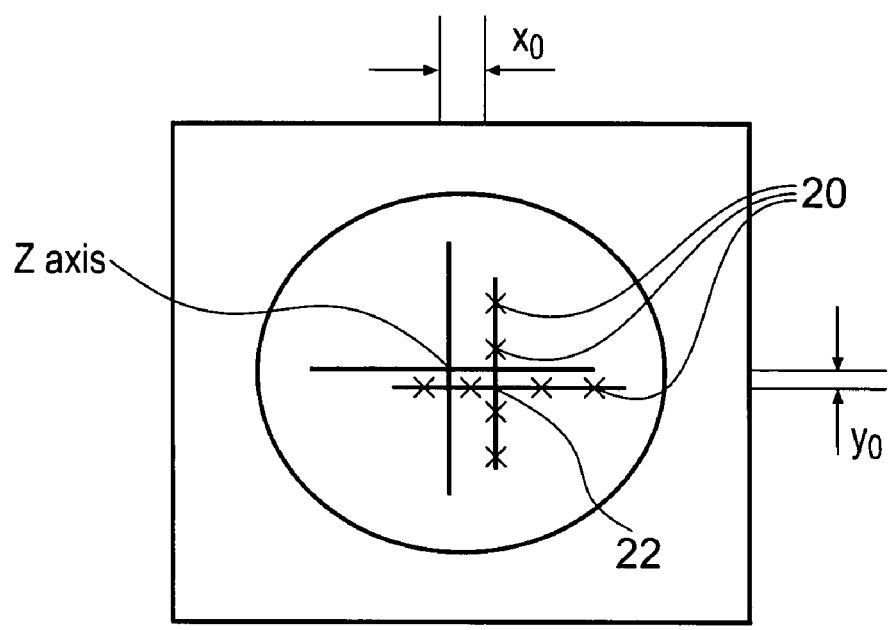
FIG. 4 is an illustration of a comparison between measured and known surfaces during calibration of a thickness probe.

In order to calibrate the spatial position of the probe 3, the (x, y) position of the apex 22 of the constructed cone surface is compared to the (x, y) position of the apex 16 of the cone 11. If the assumption described above is correct, and the thickness probe has zero offset from the reference touch probe, then the apex 22 of the constructed cone surface will exactly coincide with the z axis of the coordinate system. However, if there is an offset between the thickness probe 3 and the touch probe, resulting from physical differences between the two probes, then the apex 22 of the constructed cone surface will be offset from the z axis of the coordinate system by an amount that corresponds to the offset between the two probes. This offset will have both an x component $x_0$ and a y component $y_0$, and is determined by subtracting the (x, y) position of the apex of the constructed cone from the (x, y) position of the apex 16 of the actual cone 11 (i.e. from (0, 0)), as illustrated in FIG. 4. The calculated offset value of the thickness probe ($x_0$, $y_0$) is recorded and is applied to the positional instructions sent to the holding arm when the thickness probe 3 is in use. For example, if it is desired to measure the thickness of a component at a position (x, y), the holding arm is directed to a position (x+$x_0$, y+$y_0$).

Once the offset of the thickness probe has been determined, the probe may be calibrated for thickness measurement. This may be performed by placing the thickness probe directly over the apex 16 of the cone 11 and comparing the measured thickness reading to the known thickness $t_a$ of the block 2 at that point. A similar comparison may be conducted at other points of known thickness within the block 2.

Figure 5:
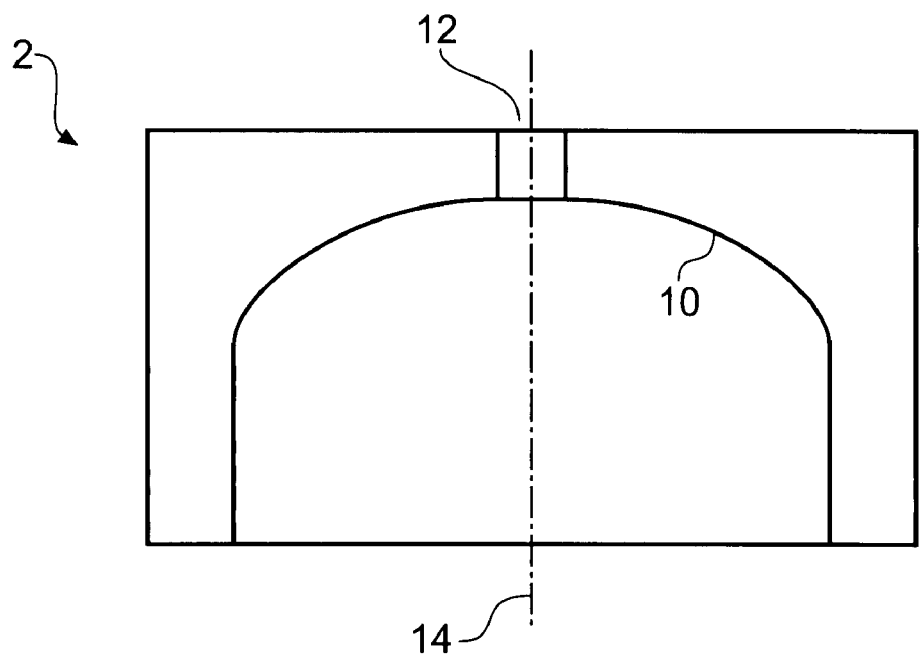
FIG. 5 is a sectional view of a calibration block according to the present invention which has a domed recess.
Figure 6:
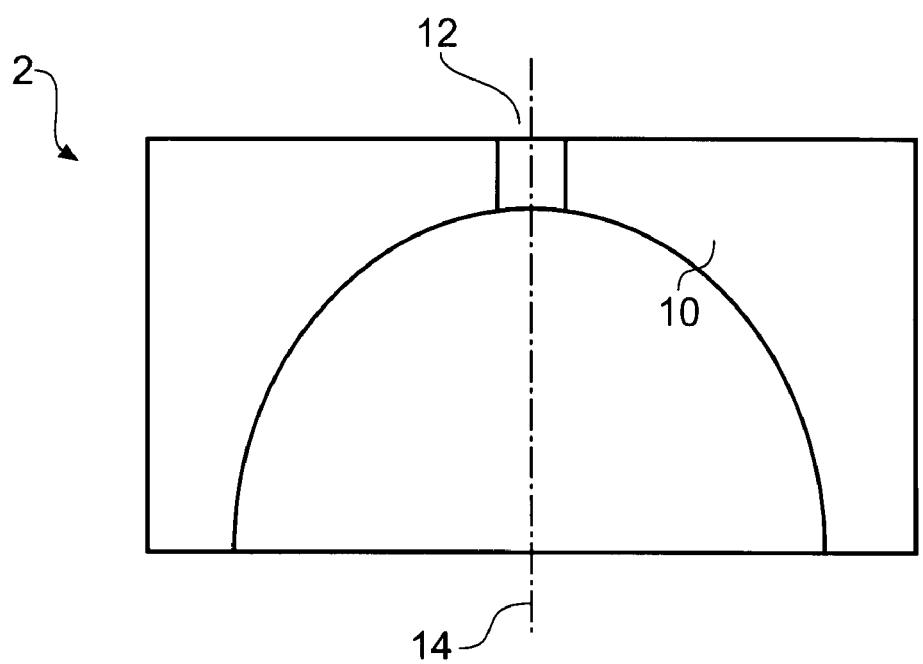
FIG. 6 is a sectional view of a calibration block according to the present invention which has a hemispherical recess.
Figure 7:
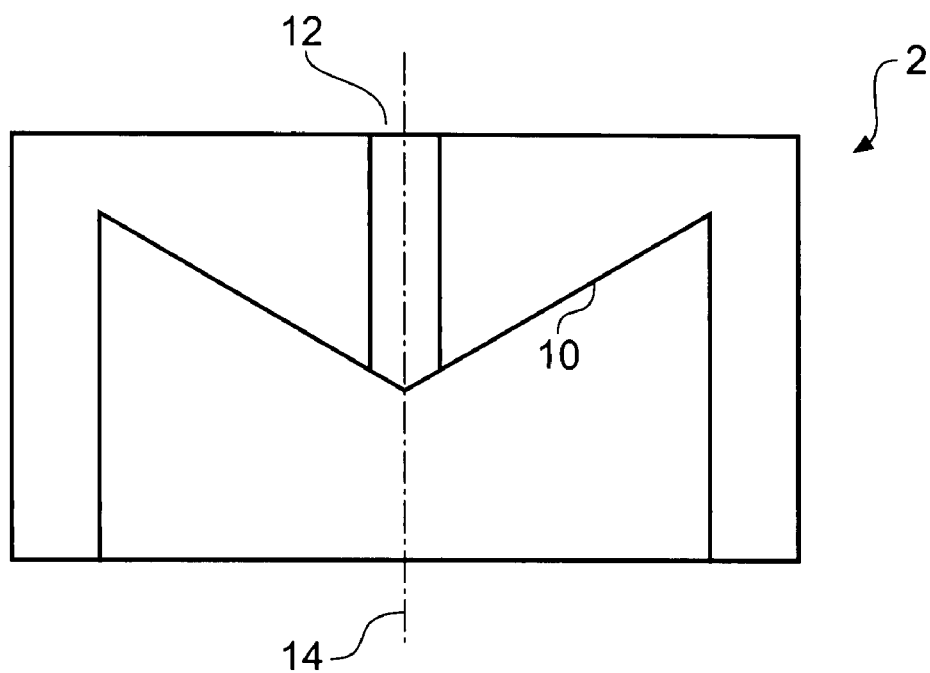
FIG. 7 is a sectional view of a calibration block according to the present invention which has an inverted conical recess.
Figure 8:
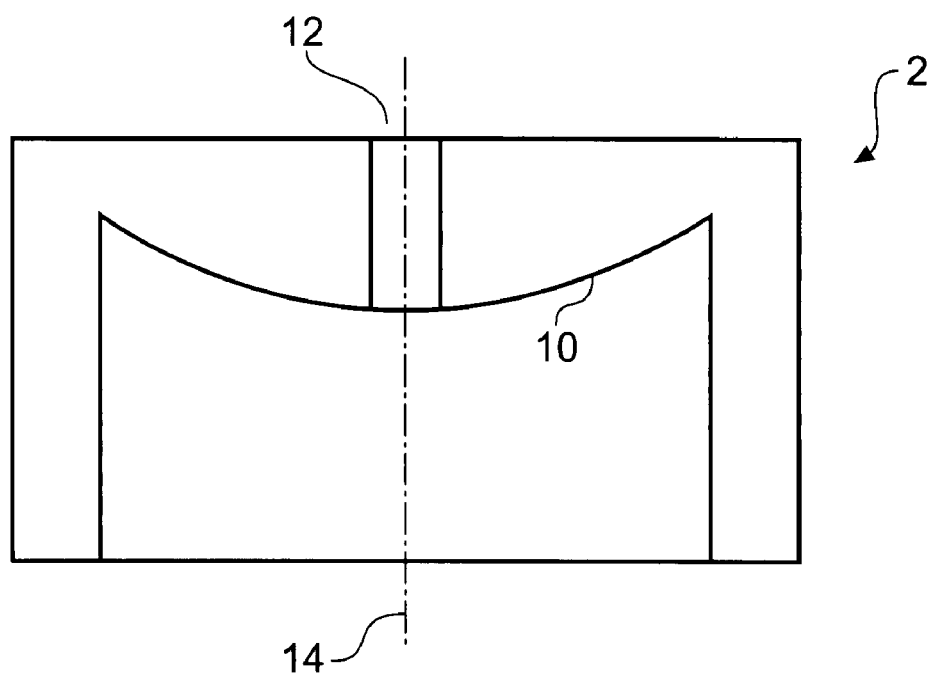
FIG. 8 is a sectional view of a calibration block according to the present invention which has catenoid recess.

In an alternative embodiment the inclined surface (or "bottom") 10 of the recess 6 may be inclined to form a shape other than a right circular cone. For example, the bottom 10 of the recess 6 may form a segment of a sphere, a hemisphere, a catenoid, a paraboloid, a truncated spheroid as shown in FIGS. 5 and 6, or any other desired geometric shape, a surface of which could be measured using a thickness probe, such as the inverted cone or catenoid shape as shown in FIGS. 7 and 8 respectively.

Figure 9:
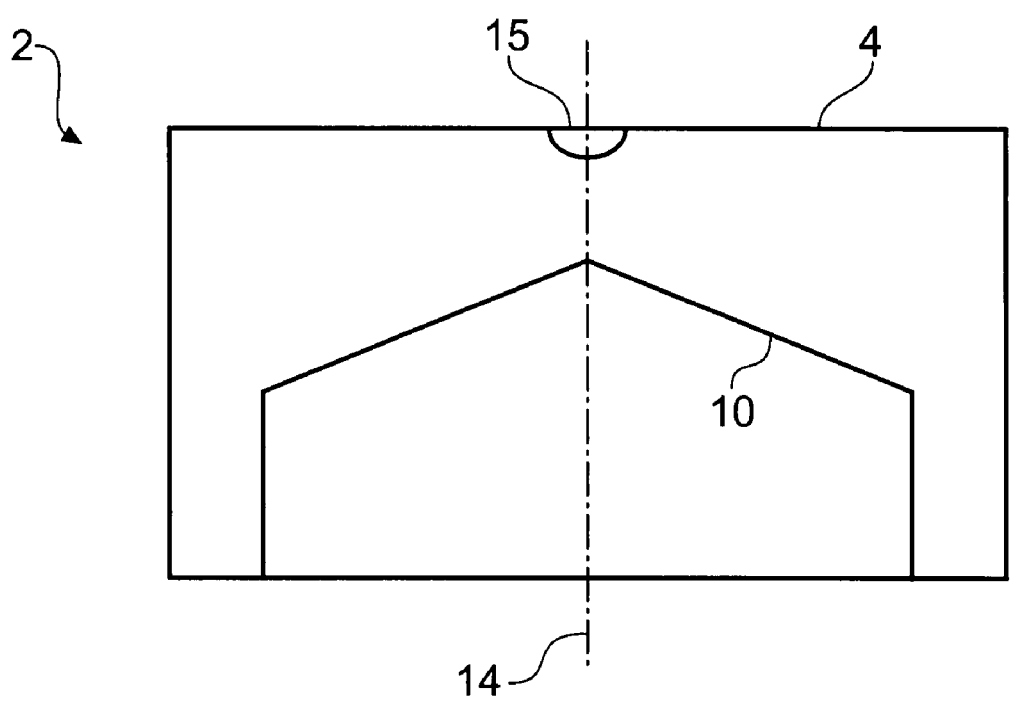
FIG. 9 is a sectional view of a calibration block according to the present invention having a reference dimple.

In an alternative embodiment as shown in FIG. 9, the reference bore may be replaced by a reference dimple 15 on the measurement face 4. The dimple 15 is positioned on the axis of the cone 11, such that the dimple performs the same function as the reference bore 12, indicating the position of the apex 16 of the cone 11.

The invention claimed is:
1. A method of calibrating a thickness probe/gauge comprising:
 a) using a calibration block having a measurement face and a recess extending inwardly of the block from a face opposite the measurement face, wherein at least part of the surface of the recess is inclined relative to the measurement face in all directions from a central region on the inclined surface of the recess, and wherein the measurement face comprises a reference feature, the location of which corresponds to a known point on the inclined surface of the recess,
 b) defining a coordinate system in the plane of the measurement face of the calibration block and extending perpendicularly into the calibration block, the coordinate system having an origin at the reference feature,
 c) noting the actual position of inclined surface of the recess in the coordinate system,
 d) placing the thickness probe over the reference feature at an undetermined offset from the origin of the coordinate system and setting the nominal position of the thickness probe to zero,
 e) measuring the thickness of the calibration block at a plurality of recorded positions remote from the reference feature,
 f) plotting the measured thickness values in the coordinate system,
 g) constructing a measured inclined surface of the recess within the coordinate system from the plotted thickness value, and
 h) comparing the measured position of the inclined surface of the recess to the actual position of the surface of the recess and generating a value representing the offset of the thickness probe relative to the defined coordinate system.

2. A method as claimed in claim 1 wherein step e) comprises measuring the thickness of the calibration block at least six positions.

3. A method as claimed in claim 2 wherein each of the positions is at a different radial separation from and/or angular position about the reference feature.

4. A method as claimed in claim 1 wherein the thickness probe comprises an ultrasonic probe, an eddy current probe or a capacitance probe.

5. A method as claimed in claim 1 wherein step b) comprises mounting a touch probe in a holding arm, using the touch probe to determine and record the location of the reference feature, setting the position of the holding arm when the touch probe is over the reference feature to be a reference position, and setting the location of the reference feature to be the origin of the coordinate system.

6. A method as claimed in claim 5 wherein step d) comprises mounting the thickness probe in the holding arm with the holding arm in the reference position.

7. A calibration block for use in a method of calibrating a thickness probe/gauge, the block having a measurement face and a recess extending inwardly of the block from a face opposite the measurement face, wherein at least part of the surface of the recess is inclined relative to the measurement face in all directions from a central region of the inclined surface of the recess and wherein the measurement face comprises a reference feature, the location of which corresponds to a known point on the inclined surface of the recess.

8. A calibration block as claimed in claim 7 wherein the thickness gauge has a diameter d and the recess has a maximum transverse dimension at the opposite face which is not less than 3d.

9. A calibration block as claimed in claim 7 wherein the recess has a circular cross section.

10. A calibration block as claimed in claim 7 wherein the inclined surface of the recess defines a right circular cone.

11. A calibration block as claimed in claim 10 wherein the inclined surface of the recess forms an angle $\alpha$ with the plane of the measurement face of not less than about 3 degrees and not greater than about 45 degrees.

12. A calibration block as claimed in claim 10 wherein the inclined surface of the recess forms an angle $\alpha$ with the plane of the measurement face of 15 degrees.

13. A calibration block as claimed in claim 10 wherein the location of the reference feature corresponds to the location of the apex of the cone.

14. A calibration block as claimed in claim 7 wherein the inclined surface of the recess defines a shape selected from the group comprising a segment of a sphere, a hemisphere, a catenoid, a paraboloid and a truncated spheroid.

15. A calibration block as claimed in claim 1 wherein the reference feature comprises a dimple.

16. A calibration block as claimed in claim 7 wherein the reference feature comprises a reference bore.

* * * * *